(12) United States Patent
Hanashima et al.

(10) Patent No.: US 12,738,748 B2
(45) Date of Patent: Sep. 15, 2026

(54) CHARGE AND DISCHARGE STATE DISPLAY DEVICE

(71) Applicant: TOYOTA JIDOSHA KABUSHIKI KAISHA, Toyota (JP)

(72) Inventors: Tateki Hanashima, Nagoya (JP); Takaaki Sano, Izumi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 628 days.

(21) Appl. No.: 18/452,904

(22) Filed: Aug. 21, 2023

(65) Prior Publication Data

US 2024/0120748 A1 Apr. 11, 2024

(30) Foreign Application Priority Data

Oct. 11, 2022 (JP) ................................ 2022-162985

(51) Int. Cl.

*H02J 7/42* (2026.01)
*B60L 53/68* (2019.01)
*H02J 50/80* (2016.01)
*H02J 105/37* (2026.01)

(52) U.S. Cl.

CPC ................ *H02J 7/42* (2026.01); *B60L 53/68* (2019.02); *H02J 50/80* (2016.02); *H02J 2105/37* (2026.01)

(58) Field of Classification Search

CPC .......... H02J 7/42; H02J 50/80; H02J 2105/37; H02J 3/32; H02J 3/322; H02J 7/80; H02J 13/10; B60L 53/68; B60L 2250/12; B60L 2250/16; B60L 53/14; B60L 53/65; B60L 53/67; B60L 55/00; B60L 58/12; B60L 53/305; Y02T 90/167; Y04S 30/12

USPC .......................................................... 320/107

See application file for complete search history.

(56) References Cited

U.S. PATENT DOCUMENTS 8,330,415 B2 * 12/2012 Sato .................. G06Q 30/0207 320/109
8,552,686 B2 * 10/2013 Jung ...................... B60L 53/00 320/132
9,014,866 B2 * 4/2015 Moriai .................. G05B 15/02 700/297
9,153,978 B2 * 10/2015 Reade .................. G06F 1/3212
9,533,594 B2 * 1/2017 Nakasone .............. B60L 53/14
10,414,283 B2 * 9/2019 Kudo .................... B60L 3/0046
10,894,484 B2 * 1/2021 Han ........................ B60L 53/67
2012/0072042 A1 * 3/2012 Moriai .................. G05B 15/02 700/297
2023/0398890 A1 * 12/2023 Hanashima ........... B60L 53/305
2024/0149721 A1 * 5/2024 Kurisaka ................ B60L 53/31

FOREIGN PATENT DOCUMENTS

CN 103053091 B * 7/2015 .............. B60L 58/25
JP 2012085383 A * 4/2012 ............. Y04S 30/12
WO WO-2014002246 A1 * 1/2014 ............. B60L 53/68

* cited by examiner

*Primary Examiner* — M Baye Diao
(74) *Attorney, Agent, or Firm* — SoraIP, Inc.

(57) ABSTRACT

When the battery is charged and discharged based on DR request, the first mode display is displayed on the display unit of the mobile terminal. The first mode display includes an end button, and when the end button is operated, the communication unit notifies the server that charging and discharging of the battery is stopped. When the user operates the end button, the mobile terminal notifies the server, so that the server can detect that the user intentionally leaves DR request.

3 Claims, 6 Drawing Sheets

100
PG
200
SERVER
HEMS
10 (10A)
10 (10B)
20
40
41
50
51
52
60
620

CHARGE AND DISCHARGE STATE DISPLAY DEVICE

CROSS-REFERENCE TO RELATED APPLICATION

This application claims priority to Japanese Patent Application No. 2022-162985 filed on Oct. 11, 2022, incorporated herein by reference in its entirety.

BACKGROUND

1. Technical Field

The present disclosure relates to a charge and discharge state display device.

2. Description of Related Art

In recent years, in order to maintain the supply-demand balance of power supplied from the power system, a Virtual Power Plant (VPP) that integrates and controls a plurality of distributed energy resources (DER) like a single power plant has been attracting attention. For example, in order to satisfy a demand from an electric power company, it is assumed that a request for Demand Response (DR) is made from a server of an aggregator to an energy management system (e.g., Home Energy Management System (HEMS)) of a consumer via an Energy Management System (EMS) network and a battery mounted on an electrified vehicle is charged and discharged, thereby utilizing the in-vehicle battery as the DER.

Japanese Unexamined Patent Application Publication No. 2012-85383 (JP 2012-85383 A) discloses a charge and discharge system having a smart grid control mode and a charge dedicated mode. In the smart grid control mode, a charge and discharge schedule of a battery is created based on various types of information such as a history of power demand in a house, a state of the battery mounted on an electrified vehicle, a present time, and the like, and charging and discharging of the battery is performed in accordance with the schedule. In the charge dedicated mode, the battery is charged by a manual operation of a user. The charge and discharge system described in JP 2012-85383 A is provided with a display that displays whether the charge and discharge state of the battery is in the smart grid control mode and performs a display including a power transmission direction between the charge and discharge device and the battery.

SUMMARY

In the charge and discharge system disclosed in JP 2012-85383 A, the consumer (user) can recognize that the charge and discharge state of the battery is charging and discharging based on the charge and discharge schedule. However, when a charge-discharge plug (charge-discharge cable) is detached from the electrified vehicle during charging and discharging based on the charge and discharge schedule, charging and discharging by the charge and discharge schedule is stopped. When the charge and discharge schedule (charge and discharge plan) is created by the server, the server cannot determine whether the user intentionally leaves the charge and discharge plan or charging and discharging are temporarily stopped due to, for example, a communication failure. Therefore, it is difficult to re-plan the charge and discharge plan.

An object of the present disclosure is to make it possible to detect that a user intentionally leaves a charge and discharge plan.

A charge and discharge state display device according to a first aspect of the present disclosure includes: a display unit that displays a charge and discharge state of an electrified vehicle equipped with a battery that is electrically connectable to a power system; and a communication unit that communicates with a server that creates a charge and discharge plan of the battery. The display unit of the charge and discharge state display device displays a first mode display displayed when charging and discharging of the battery is performed based on the charge and discharge plan created by the server, and a second mode display displayed when a user of the electrified vehicle operates to perform charging and discharging of the battery. The first mode display includes an end operation unit that displays completion of charging and discharging of the battery. When the end operation unit is operated, the communication unit of the charge and discharge state display device notifies the server that charging and discharging of the battery is stopped.

According to this configuration, when charging and discharging of the battery is performed based on the charge and discharge plan created by the server, the first mode display is displayed on the display unit. The first mode display includes the end operation unit that displays a message indicating that charging and discharging of the battery is ended, and when the end operation unit is operated, the communication unit notifies the server that creates the charge and discharge plan of the battery that charging and discharging of the battery is stopped. When the user operates the end operation unit, the charge and discharge state display device notifies the server that creates the charge and discharge plan. Therefore, the server can detect that the user intentionally leaves the charge and discharge plan.

In the charge and discharge state display device according to the first aspect, the display unit and the communication unit may be provided in a mobile terminal held by the user.

According to such a configuration, the first mode display and the second mode display are displayed on the mobile terminal held by the user. Therefore, convenience of the user can be enhanced.

In the charge and discharge state display device according to the first aspect, the second mode display may not include an end operation unit that displays completion of charging and discharging of the battery.

According to such a configuration, since the end operation unit is displayed only in the first mode display, the troublesomeness of the user can be reduced.

According to the present disclosure, it is possible to detect that the user intentionally leaves the charge and discharge plan.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
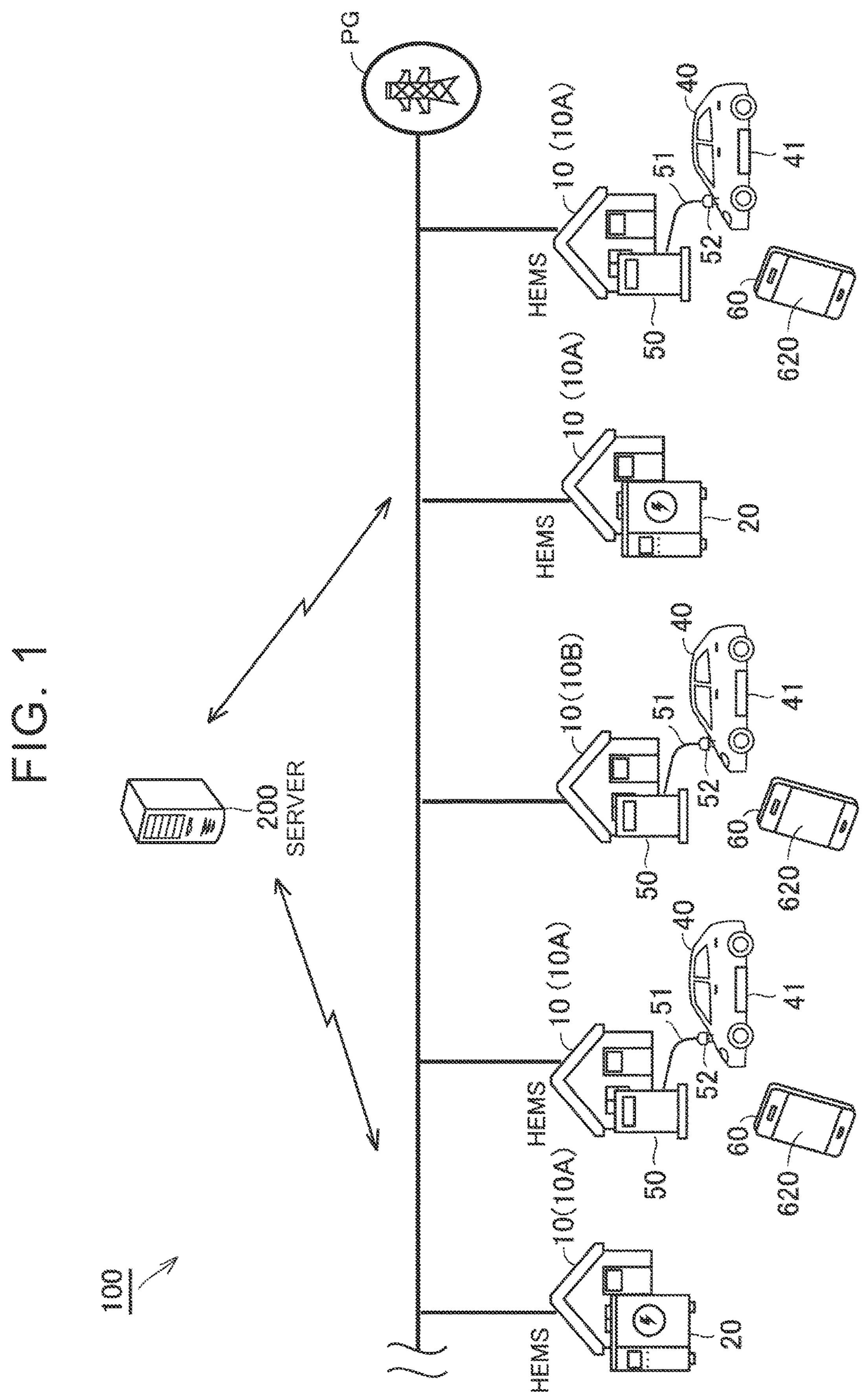
FIG. 1 is a schematic overall configuration diagram of a power system including a charge and discharge state display device according to the present embodiment.

Hereinafter, embodiments of the present disclosure will be described in detail with reference to the drawings. In the drawings, the same or corresponding parts are denoted by the same reference numerals, and the description thereof will not be repeated.

FIG. 1 is a schematic overall configuration diagram of a power system including a charge and discharge state display device according to the present embodiment. The power system 100 of the present embodiment is a VPP system. VPP system is a mechanism that combines a large number of DER by advanced energy management technology using Internet of Things (IoT) and causes these DER to function like a single power plant by remote and integrated control. In the power system 100 of the present embodiment, a stationary battery 20 and an electrified vehicle 40 on which a battery is mounted are used as DER.

As shown in FIG. 1, the power system 100 includes a power system PG, a house 10, a stationary battery 20, an electrified vehicle 40, an Electric Vehicle Service Equipment (EVSE) 50, and server 200. The power system PG is an electric power system including a power plant, a transmission line, a high-voltage substation, and the like, and is an electric power grid managed by an electric power company (a power generation company, a transmission and distribution company, a retail electric power company, and the like).

The server 200 is a server managed and operated by the resource aggregator, and performs DER control by directly concluding a VPP service contract with a customer who holds DER. The server 200 creates a charge and discharge plan of DER based on the requested DR request from the aggregation coordinator or the electric power company.

The house 10 connected to the power system PG is distinguished from a house 10A having HEMS and a house 10B having no HEMS. HEMS controls charging and discharging of DER based on the charge and discharge planning transmitted from the server 200. The stationary battery 20 is provided in house 10A provided with HEMS, and charging and discharging of the stationary battery 20 are controlled by the HEMS.

Electrified vehicle 40 is configured to be able to travel using electric power stored in the battery 41. Electrified vehicle 40 according to the present embodiment is a battery electric vehicle (BEV that does not include an engine (internal combustion engine), but may be a plug-in hybrid electric vehicle (PHEV). The battery 41 is composed of, for example, a secondary battery such as a lithium-ion battery or a nickel metal hydride battery. Electrified vehicle 40 includes an inlet and a charge-discharge circuit (not shown) for charging and discharging the battery 41.

EVSE 50 is a power supply device corresponding to Vehicle to Home (V2H) (or Vehicle to Grid (V2G), and converts AC power supplied from the power system PG into DC power to charge the battery 41. EVSE 50 converts the DC power discharged from the battery 41 into AC power and supplies the AC power to the household electrical appliance of the house 10. Note that the electric power discharged from the battery 41 may be supplied to the power system PG (reverse power flow). The plug (connector) 52 of the charge/discharge cable 51 of EVSE 50 is connected (plugged in) to the inlet of electrified vehicle 40 so that electrified vehicle 40 can be charged and discharged (that is, power can be exchanged with EVSE 50).

EVSE 50 installed in the house 10A provided with HEMS is controlled by HEMS, and EVSE 50 installed in the house 10B without HEMS is controlled by the control unit of the electrified vehicle 40.

The mobile terminal 60 is an exemplary charge and discharge state display device that displays the charge/discharge state of electrified vehicle 40 (battery 41). The mobile terminal 60 is a mobile terminal held by a user of electrified vehicle 40, and may be, for example, a smart phone or a mobile terminal. The mobile terminal 60 and electrified vehicle 40 are paired, and form a pair by recognizing both identification numbers (ID), for example.

Figure 2:
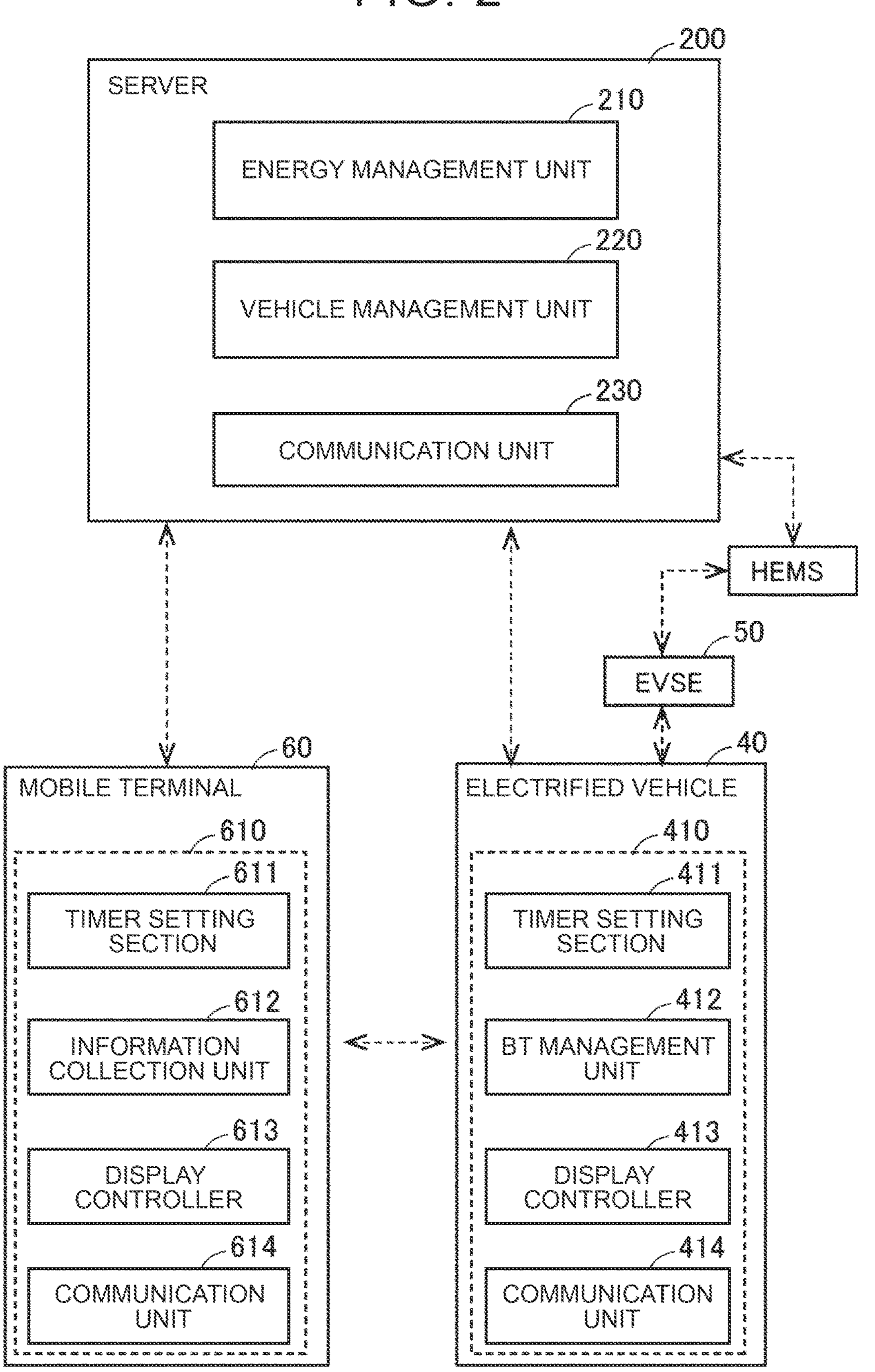
FIG. 2 is a schematic diagram illustrating a configuration of each device such as a server in the present embodiment.

FIG. 2 is a schematic diagram illustrating a configuration of each device such as the server 200 in the present embodiment. The server 200 includes hardware such as Central Processing Unit (CPU) and memories, and the hardware constitutes functional blocks of the energy management unit 210, the vehicle management unit 220, and the communication unit 230. For example, the energy management unit 210 receives a DR request from the aggregation coordinator and creates a DR demand plan for the respective DER. For example, if DR request is a raised DR, a DR demand plan is created to perform, for example, charge so that the power consumed by the respective DER is increased. If DR request is a down DR, for example, DER may create a DR demand plan that performs discharging. The vehicle management unit 220 creates a charge and discharge plan for electrified vehicle 40. The charge and discharge plan of electrified vehicle 40 is created based on DR demand plan and electrified vehicle 40 timer charge plan created by the energy management unit 210. The communication unit 230 communicates with the mobile terminal 60, electrified vehicle 40, HEMS, and the like. The communication unit 230 also communicates with a server of an aggregation coordinator (not shown).

The control unit 410 of electrified vehicle 40 includes hardware such as a CPU and a memory, and these hardware components constitute the respective functional blocks of the timer setting unit 411, the battery management unit 412, the display control unit 413, and the communication unit 414. The communication unit 414 communicates with the server 200, EVSE 50, the mobile terminal 60, and the like. The timer setting unit 411 sets timer charging of the battery 41. The timer charging may be automatically set so as to start charging from an arbitrary time designated by the user or to end charging by an arbitrary time (departure time) designated by the user and to perform charging in a time zone of midnight power.

The battery management unit 412 detects the status (e.g., State Of Charge (SOC) of the battery 41 and executes charge/discharge control of the battery 41. The display control unit 413 controls display of a Human Machine Interface (HMI device (not shown) provided in electrified vehicle 40. HMI device may be, for example, a multi-information display provided in a dashboard.

The control unit 610 of the mobile terminal 60 includes hardware such as a CPU and a memory, and the hardware constitutes functional blocks of the timer setting unit 611, the information collection unit 612, the display control unit 613, and the communication unit 614. The communication unit 614 communicates with the server 200, electrified vehicle 40, and the like. The timer setting unit 611 sets timer charging of the battery 41. The function of the timer setting unit 611 is the same as that of the timer setting unit 411. The information collection unit 612 collects, from the server 200 (the vehicle management unit 220) and electrified vehicle 40, the charge and discharge plan of electrified vehicle 40, the state of the battery 41 (for example, the state of SOC and charge/discharge), and the like. The display control unit 613 controls display of a display (display unit) of the mobile terminal 60.

DR request transmitted from the aggregation coordinator to the server 200 is a time-zone (date and time) in which DR is executed and the required charge/discharge power, for example, 30 minutes is set as one frame, and the charge/discharge power in the respective frames is set. Based on DR request transmitted from the aggregation coordinator, the energy management unit 210 of the server 200 creates a DR demand plan for each DER according to the characteristics and size of each DER. The vehicle management unit 220 creates a charge and discharge plan of the battery 41 based on DR demand plan of electrified vehicle 40 created by the energy management unit 210 and the plan of the timer charge set by the timer setting units 411 and 611. The charge and discharge plan of the battery 41 is created so that, for example, when the timer charging is set so that the charging is ended by any time (departure time) designated by the user, the charging/discharging according to DR request plan can be performed while satisfying the charging end time by the timer charging, and the energy management unit 210 and DR request plan are adjusted as needed. Therefore, the charge and discharge plan of the battery 41 includes a charge and discharge plan based on DR request and a charge and discharge plan based on the timer charge. The charge and discharge plan based on DR request corresponds to an exemplary "charge and discharge plan created by the server" of the present disclosure.

In the house 10A including HEMS, the charge and discharge plan created by the vehicle management unit 220 is transmitted to HEMS and EVSE 50 is controlled by HEMS, thereby performing charge/discharge of the battery 41 in accordance with the charge and discharge plan. In the house 10B without HEMS, the charge and discharge plan created by the vehicle management unit 220 is transmitted to electrified vehicle 40 (the control unit 410), and electrified vehicle 40 (the control unit 410) controls EVSE 50 to charge/discharge the battery 41 in accordance with the charge and discharge plan.

Figure 3C:
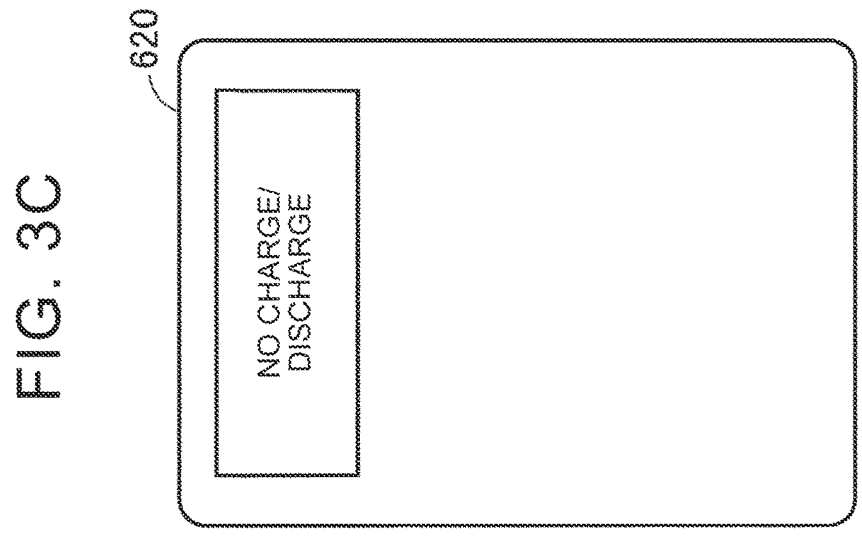
FIG. 3C is a diagram illustrating display items displayed on a display unit of a mobile terminal.
Figure 3B:
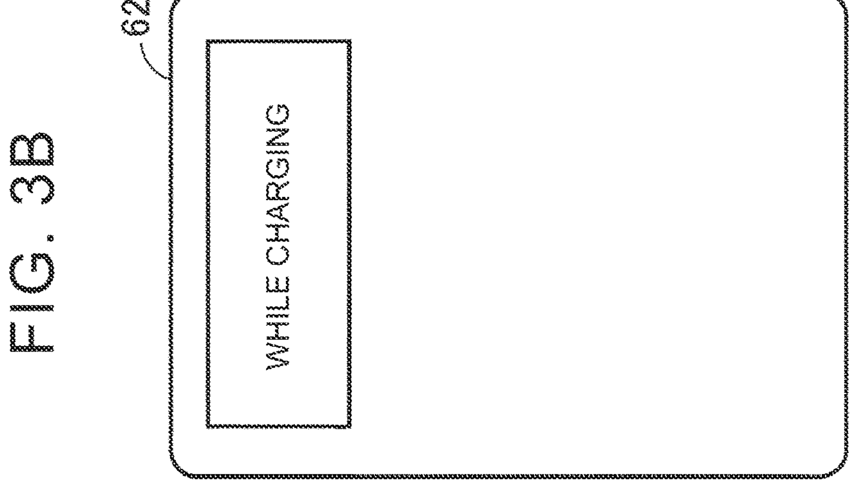
FIG. 3B is a diagram illustrating display items displayed on a display unit of a mobile terminal.
Figure 3A:
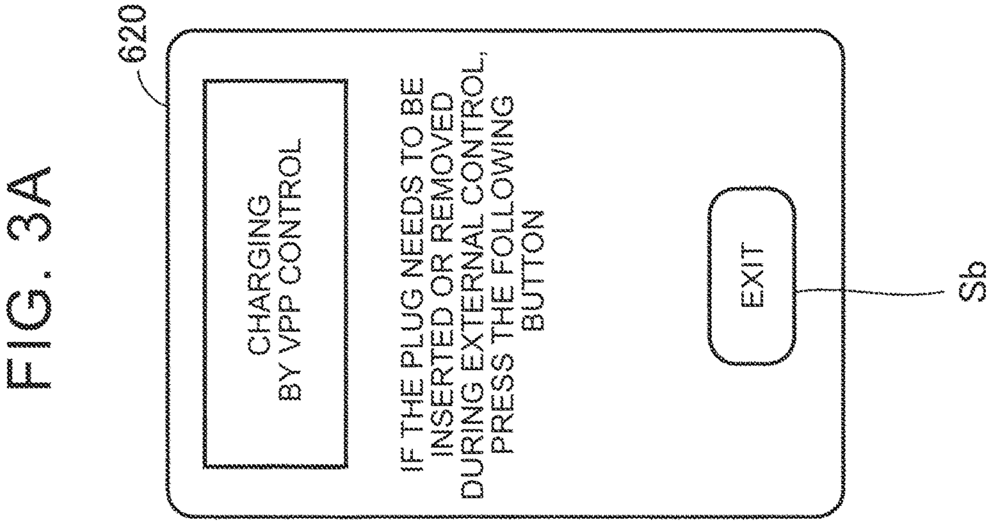
FIG. 3A is a diagram illustrating display items displayed on a display unit of a mobile terminal.

FIGS. 3A to 3C show a diagram for describing display items displayed on the display unit (display) 620 of the mobile terminal 60. FIG. 3A is a diagram illustrating a first mode display. FIG. 3A is an example of display items displayed on the display unit 620 of the mobile terminal 60 when the battery 41 is being charged according to the charge and discharge plan created by the server, and corresponds to an example of "first mode display" of the present disclosure. In the first mode display, a display indicating that charging is in progress (charging is in progress by VPP control) based on the charge and discharge plan created by the server and an end-button Sb are displayed. The end-button Sb corresponds to an exemplary "end operation unit" of the present disclosure. When discharging is executed from the battery 41 based on the charge and discharge plan created by the server, a message indicating "discharging" is displayed instead of "charging in progress" (for example, "discharging in progress by VPP control" is displayed instead of "charging in progress" by VPP control). Note that the display mode of the end-button Sb may not be "end", and may be, for example, a display of "stop", "interruption", or the like.

FIG. 3B is a diagram illustrating a second mode display. FIG. 3B is an example of display items displayed on the display unit 620 of the mobile terminal 60 when the battery 41 is being charged by the timer charging (according to the charge and discharge plan based on the timer charging) or by charging starting operation of the user, and corresponds to an example of "second mode display" of the present disclosure. The timer charging is set by the user, and is included in the user's operation to perform charging and discharging of the battery 41. In the second mode display, the end-button Sb is not displayed. When discharging is executed from the battery 41 in response to a user's discharging starting operation or a HEMS request, a message indicating "discharging" is displayed instead of "charging".

FIG. 3C is a diagram illustrating a stop-display. In FIG. 3C, when the battery 41 is not charged and discharged, the display items are displayed on the display unit 620 of the mobile terminal 60, and a message indicating "no charge and discharge" is displayed.

Figure 4:
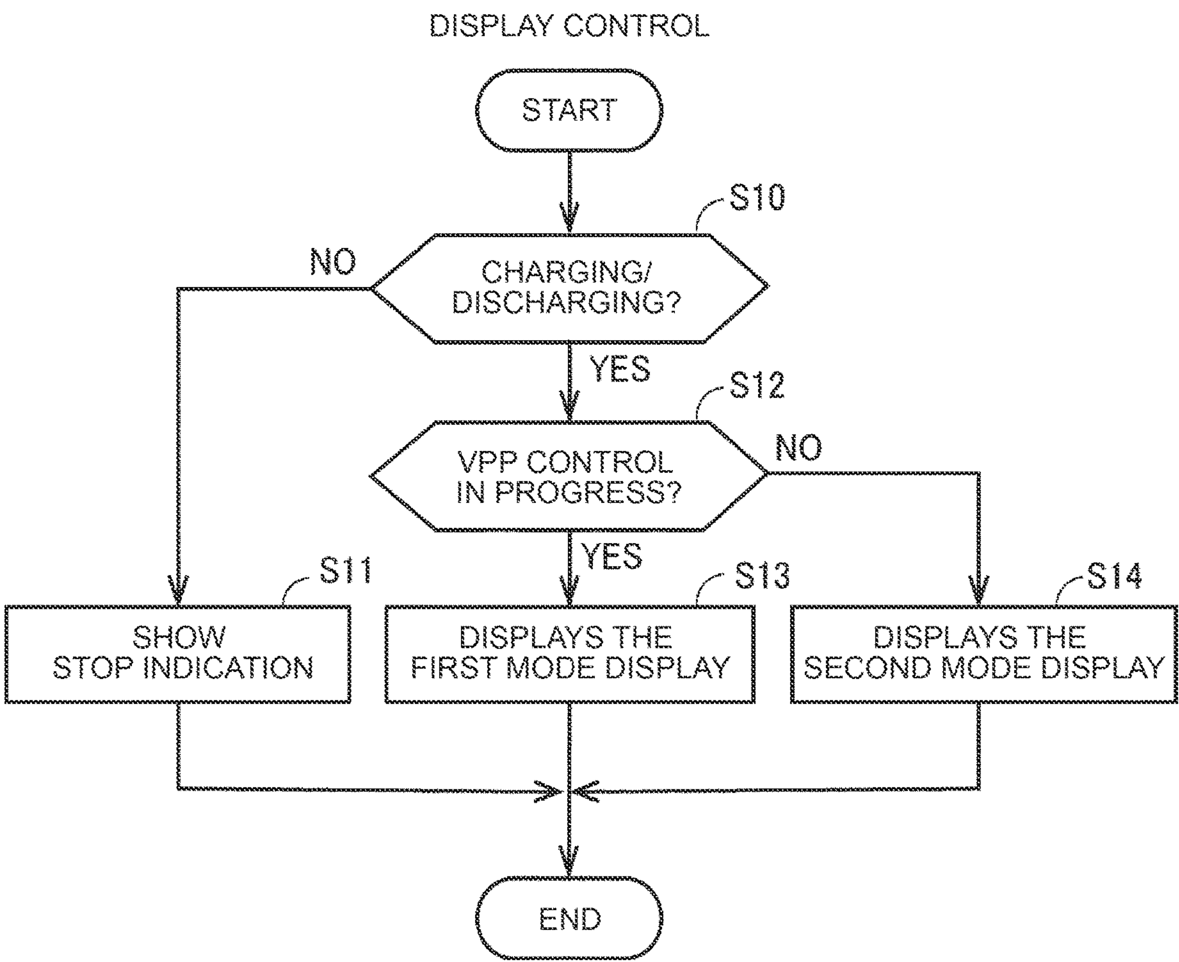
FIG. 4 is a flowchart illustrating an example of display control processed by the control device of the mobile terminal.

FIG. 4 is a flowchart illustrating an example of display control processed by the control unit 610 of the mobile terminal 60. This flowchart is executed when there is a charging state display request operation. The charging state display request operation is performed, for example, by the user pressing a display request button displayed on the display unit 620. When there is a charge state display operation request, in step (hereinafter, step is abbreviated as "S") 10, it is determined whether or not the battery 41 is being charged and discharged. For example, the information collection unit 612 may determine whether the battery 41 is being charged or discharged based on the charge and discharge state of the battery 41 collected from the battery management unit 412. If the battery 41 is not being charged or discharged, a negative determination is made by S10, and the process proceeds to S11. If the battery 41 is being charged or discharged, an affirmative determination is made in S10, and the process proceeds to S12.

In S11, the display control unit 613 sets the display items displayed on the display unit 620 of the mobile terminal 60 to "stop display" (refer to FIG. 3C), and ends the present routine.

In S12, it is determined whether or not charging and discharging of the battery 41 are under VPP control. Note that VPP control is performed when the battery 41 is being charged and discharged based on the charge planning created by the server. For example, the information collection unit 612 may determine whether or not VPP control is in progress based on the charge and discharge plan and the present time collected from the vehicle management unit 220. For example, when the current time is the time zone of the charge and discharge plan based on DR request, it is determined that VPP control is being performed, and when the current time is not the time zone of the charge and discharge plan based on DR request, it is determined that the VPP control is not being performed. In S12, when it is determined that VPP control is being performed (affirmative determination), the process proceeds to S13. In S12, if it is determined that VPP control is not in progress (negative determination), the process proceeds to S14.

In S13, the display control unit 613 sets the display items displayed on the display unit 620 of the mobile terminal 60 as "first mode display" (see FIG. 3A), and ends the present routine. In S14, the display control unit 613 sets the display items displayed on the display unit 620 of the mobile terminal 60 as "second mode display" (see FIG. 3B), and ends the present routine.

Figure 5:
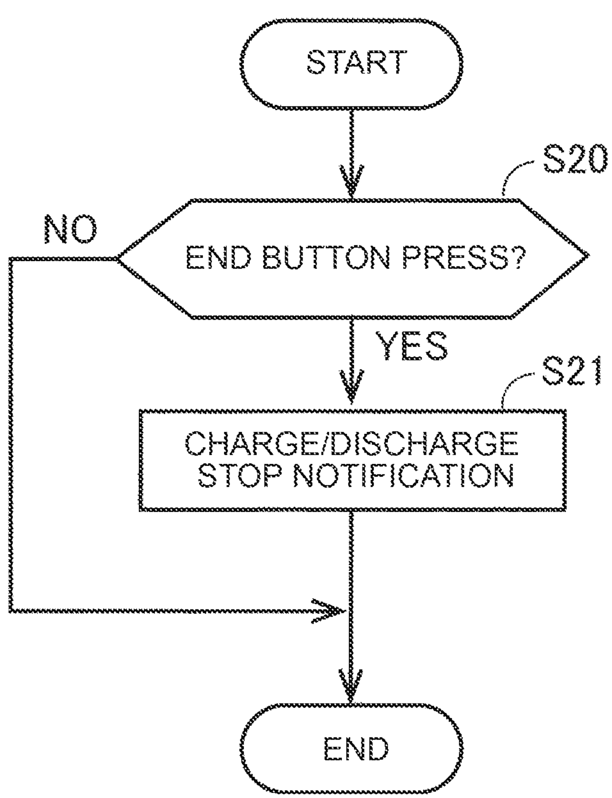
FIG. 5 is a flowchart illustrating an example of notification control processed by the control device of the mobile terminal.

FIG. 5 is a flowchart illustrating an example of notification control processed by the control unit 610 of the mobile terminal 60. When the display items displayed on the display unit 620 of the mobile terminal 60 are "first mode display" (refer to FIG. 3A), this flow chart is repeatedly processed at predetermined intervals.

In S20, it is determined whether or not the end-button Sb is pressed. When the end button Sb is pressed and the end button Sb is operated, an affirmative determination is made, and the process proceeds to S21. If the end-button Sb is not pressed, a negative determination is made, and the routine ends.

In S21, the communication unit 614 transmits a charge/discharge stop notification to the vehicle management unit 220 of the server 200, and then ends the present routine. The charge/discharge stop notification is a notification that the end-button Sb is pressed and the user removes the plug 52 from the inlet of electrified vehicle 40.

According to the present embodiment, based on DR request from the aggregation coordinator (the request plan requested by the power system), the server 200 (the vehicle management unit 220) creates a charge and discharge plan for electrified vehicle 40 (the battery 41). When the battery 41 is being charged and discharged based on DR request (during VPP control), the first mode display is displayed on the display unit 620. The first mode display includes an end button Sb, and when the end button Sb is operated (when pressed), the communication unit 614 notifies the server 200 that charging and discharging of the battery 41 is stopped (S21). When the user operates the end-button Sb, the mobile terminal 60 notifies the server 200, so that the server 200 can detect that the user intentionally leaves the charge and discharge plan (DR request) created by the server 200. When the server 200 (the vehicle management unit 220) detects that the user intentionally leaves the charge and discharge plan (DR request), the server can respond to DR request by, for example, re-creating a DR demand plan (charge and discharge plan) of each DER.

According to the present embodiment, the second mode display is displayed on the display unit 620 when the charging or discharging of the battery 41 is executed by the timer charging (according to the charge and discharge plan based on the timer charging) or by the charging and discharging start operation of the user, that is, when the user operates the charging and discharging of the battery based on the needs of the user. The second mode display does not include an end button Sb. Since the end-button Sb is not displayed on the display unit 620 when the charging/discharging is not performed based on DR request, the user's troublesomeness can be reduced.

In the first mode display, EVSE 50 may be controlled so that the charging and discharging of the battery 41 is stopped when the end-button Sb is operated. In this case, when charging and discharging are stopped, the locking mechanism between the plug 52 and the inlet may be released, and the plug 52 may be pulled out from the inlet.

When the end-button Sb is operated, charging and discharging of the battery 41 may not be stopped. In this case, the locking mechanisms of the plug 52 and the inlet may be released by operating the unlocking operation unit provided in electrified vehicle 40 or the unlocking button displayed on the display unit 620 of the mobile terminal 60, and the plug 52 may be removed from the inlet. Further, the charging and discharging of the battery 41 may be stopped in synchronization with the operation of the unlock operation unit or the unlock button.

In the above embodiment, an example has been described in which the mobile terminal 60 is configured as a "charge and discharge state display device" of the present disclosure. However, electrified vehicle 40 control unit 410 and HMI device (multi-information display) provided in electrified vehicle 40 may be used as a charge and discharge state display device having the same function as that of the mobile terminal 60.

In the above-described embodiment, the server 200 creates a charge and discharge plan based on DR request. However, the "charge and discharge plan created by the server" in the present disclosure, in which the charge and discharge plan may be created by the server without being based on DR request, for example, in accordance with the agreement to be executed for the electric power company, is a charge and discharge plan created by the server without being based on the needs of the user of electrified vehicle (without being operated/set by the user).

Modification

Figure 6A:
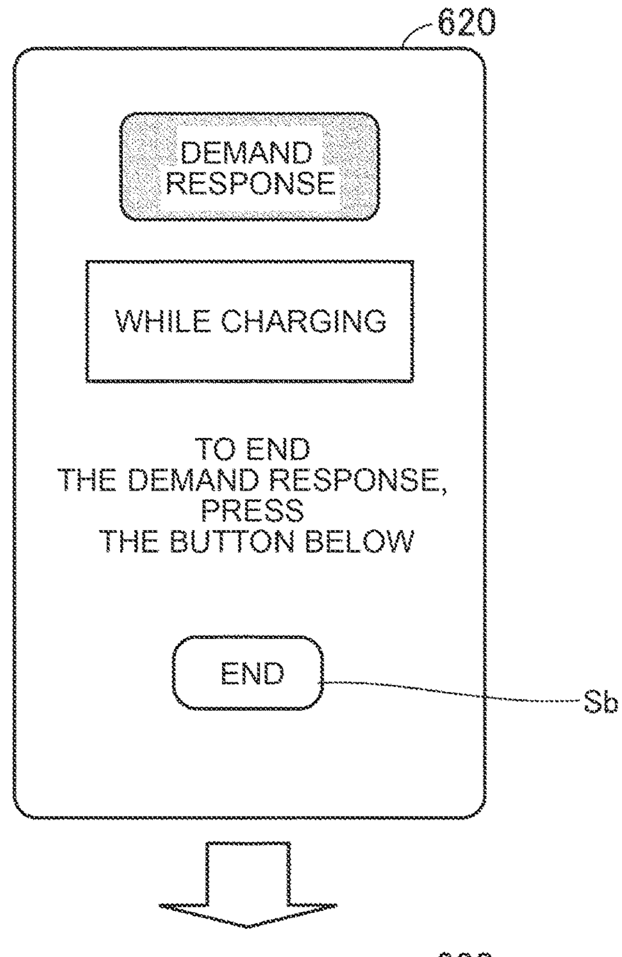
FIG. 6A is a diagram for explaining the display items displayed on the display unit of the mobile terminal in a modification.
Figure 6B:
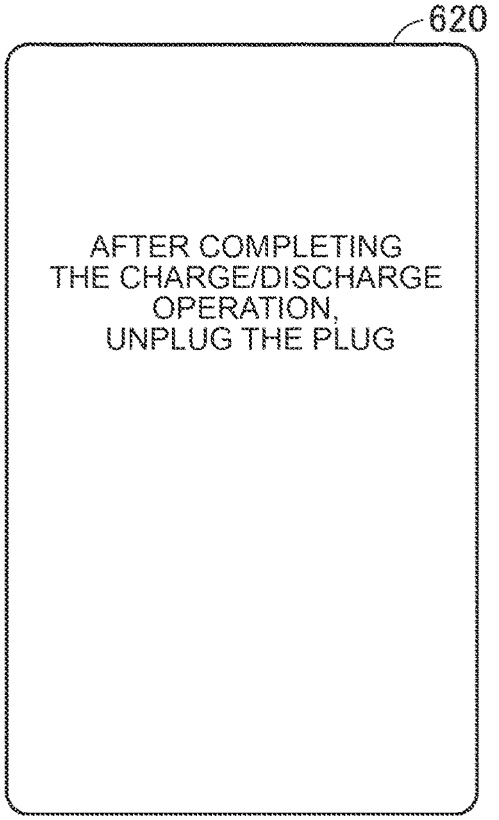
FIG. 6B is a diagram illustrating display items displayed on the display unit of the mobile terminal in a modification.

FIG. 6A and FIG. 6B are diagrams illustrating display items displayed on the display unit 620 of the mobile terminal 60 in a modification. In the modification, the "second mode display" and the "stop display" are the same as those in the above-described embodiment. FIG. 6A is a diagram illustrating a first mode display. FIG. 6A shows display items displayed on the display unit 620 of the mobile terminal 60 when the battery 41 is being charged in accordance with the charge and discharge planning based on DR request. In this modification, the item "demand response" is displayed to indicate that the battery is being charged based on DR request. When discharging is executed from the battery 41 based on DR request, a message indicating "discharging" is displayed instead of "charging".

In this modification, the charging and discharging of the battery 41 is not stopped when the end-button Sb is operated. When the charging/discharging stop operation unit provided in EVSE 50 is operated, or when the charging/discharging stop operation unit provided in electrified vehicle 40 is operated, or when the charging/discharging stop button displayed on the display unit 620 of the mobile terminal 60 is operated, the charging/discharging of the battery 41 is stopped.

FIG. 6B is a diagram for explaining a transitional indication. FIG. 6B is a diagram showing display items displayed on the display unit 620 of the mobile terminal 60 when the end-button Sb of the first mode display is operated (pressed). In the "transition display", the user is alerted to remove the plug 52 after performing the charge/discharge end operation. Before the plug 52 is pulled out from the inlet, attention is given to performing a charge/discharge end operation, so that convenience in inserting and removing the plug 52 can be improved.

The embodiment disclosed herein should be considered as illustrative and not restrictive in all respects. The scope of the present disclosure is defined not by the above description of the embodiments but by the claims, and is intended to include all possible modifications within a scope equivalent in meaning and scope to the claims.

What is claimed is:

1. A charge and discharge state display device comprising:

a display unit that displays a charge and discharge state of an electrified vehicle equipped with a battery that is electrically connectable to a power system; and a communication unit that communicates with a server that creates a charge and discharge plan of the battery, wherein:

the display unit displays a first mode display displayed when charging and discharging of the battery is performed based on the charge and discharge plan created by the server, and a second mode display displayed when a user of the electrified vehicle operates to perform charging and discharging of the battery;

the first mode display includes an end operation unit that displays completion of charging and discharging of the battery; and when the end operation unit is operated, the communication unit notifies the server that charging and discharging of the battery is stopped.

2. The charge and discharge state display device according to claim 1, wherein the display unit and the communication unit are provided in a mobile terminal held by the user.

3. The charge and discharge state display device according to claim 1, wherein the second mode display does not include the end operation unit.

* * * * *